United States Patent [19]

Rickards et al.

[11] 4,176,613

[45] Dec. 4, 1979

[54] FIXED GEOMETRY WATER JET INLET FOR A SURFACE EFFECT SHIP

[75] Inventors: Michael A. Rickards, La Jolla; Richard K. Ruhe, San Diego; Leonard Meyerhoff, Chula Vista; James M. Hook, Solana Beach, all of Calif.

[73] Assignee: Rohr Industries, Inc., Chula Vista, Calif.

[21] Appl. No.: 854,637

[22] Filed: Nov. 25, 1977

[51] Int. Cl.$^2$ ............................................. B63H 11/02
[52] U.S. Cl. .................... 114/67 A; 115/12 R
[58] Field of Search ............... 115/12 R, 12 A, 11, 115/14, 16; 180/116, 117, 120, 126; 137/15.1; 244/53; 114/67 A, 67 R

[56] References Cited

U.S. PATENT DOCUMENTS

| 3,598,080 | 8/1971 | Shields ............................ 115/14 |
| 3,877,408 | 4/1975 | Crowder ....................... 114/67 A |
| 3,981,262 | 9/1976 | DeVault et al. ............... 115/14 X |
| 4,090,459 | 5/1978 | Chaplin ....................... 114/67 A |

*Primary Examiner*—Douglas C. Butler
*Attorney, Agent, or Firm*—Patrick J. Schlesinger; Frank D. Gilliam

[57] ABSTRACT

A water jet inlet as used in a surface effect ship, cavitation free environment is provided of a fixed round or rectangular inlet geometry, within the confines of inlet velocity ratios pertaining to the ship velocity immersion design profile. An additional embodiment is disclosed that enables the instant invention to operate at a range of drop fractions, including negative drop fractions, and allows for a truly flush inlet, resulting in minimizing the drag of the ship and potential ingestion of large floating debris.

11 Claims, 9 Drawing Figures

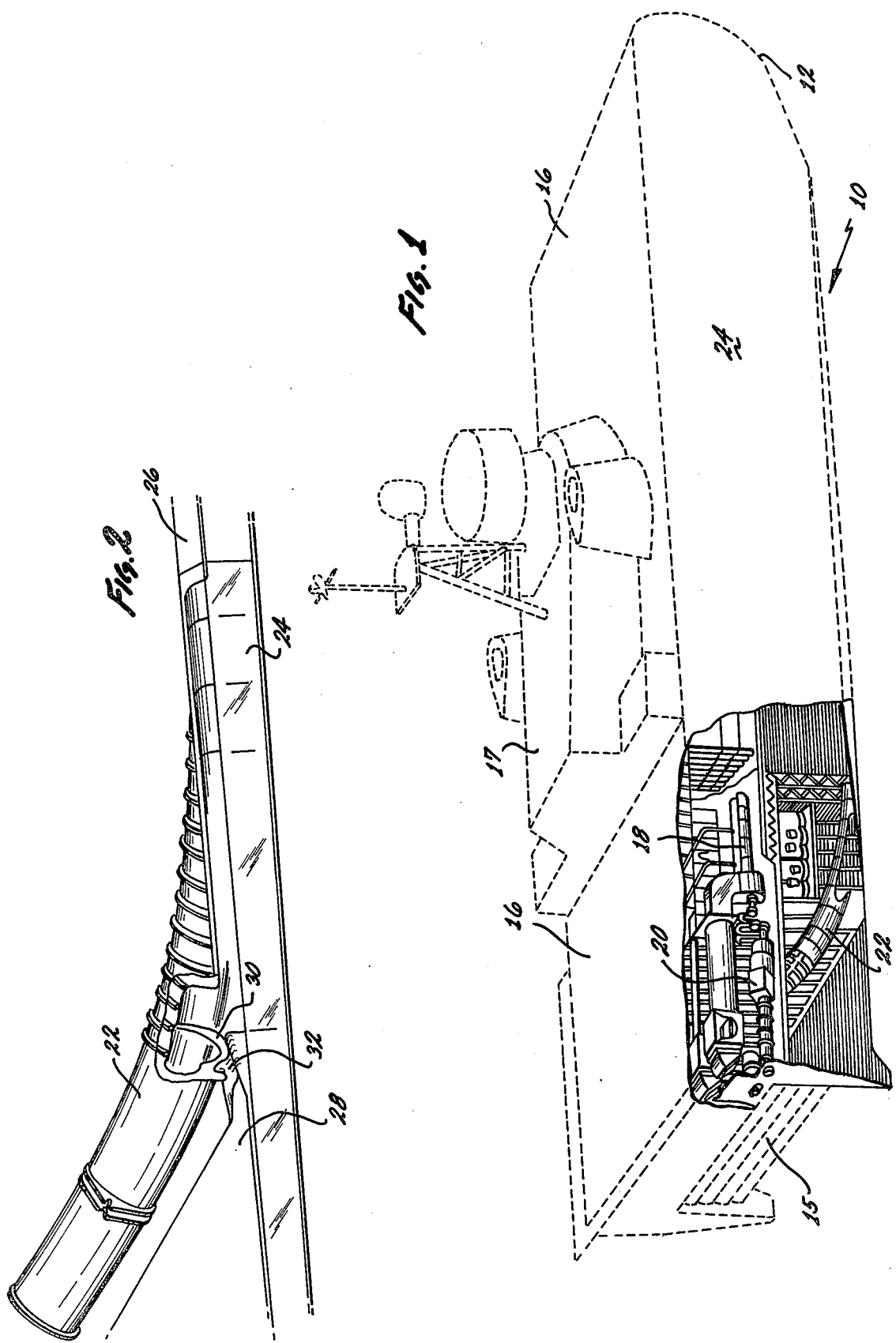

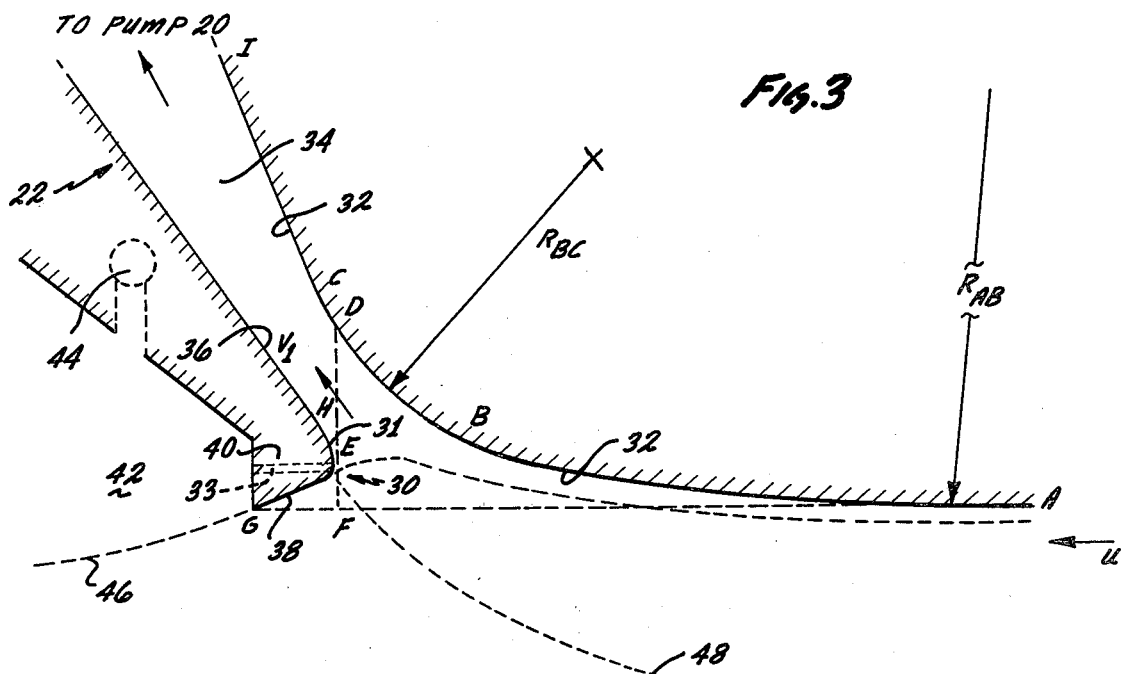
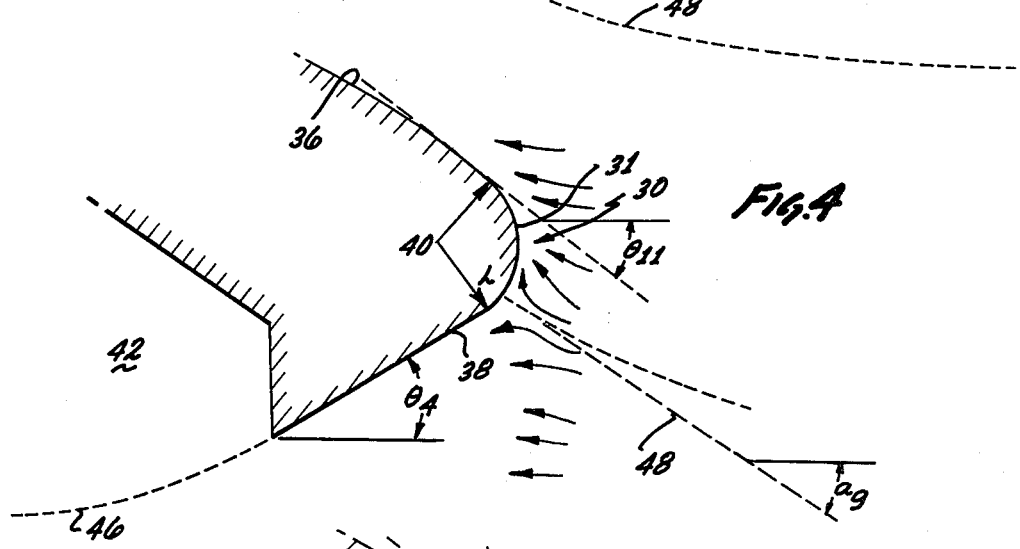
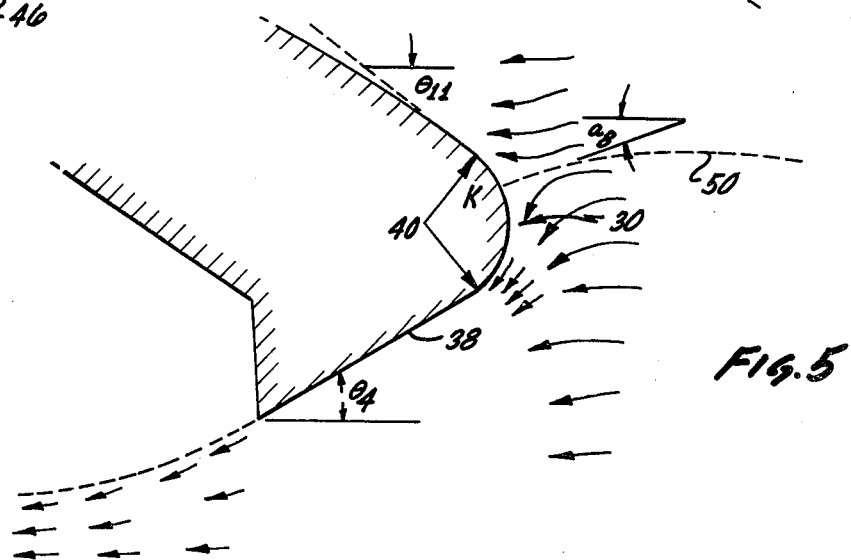

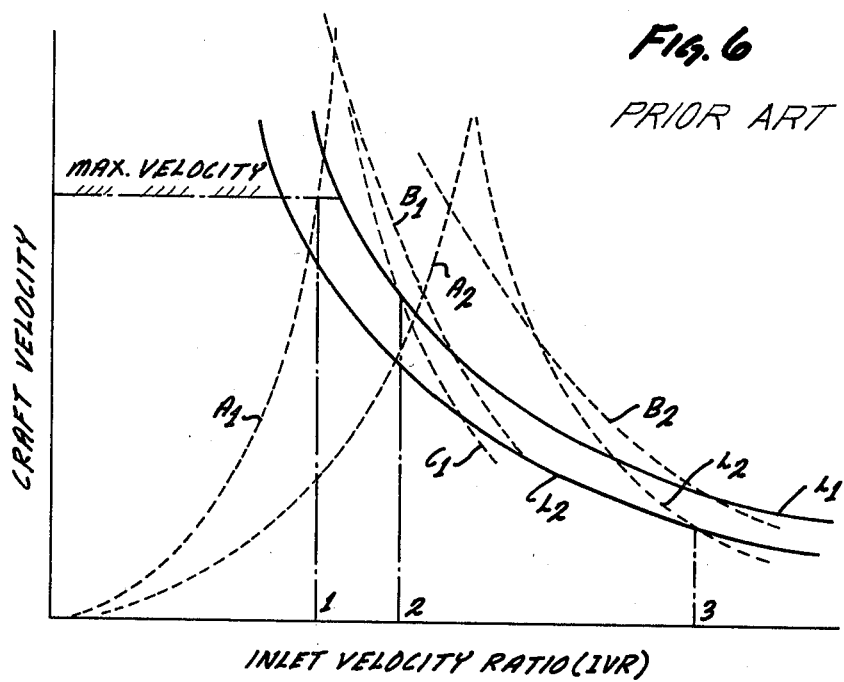
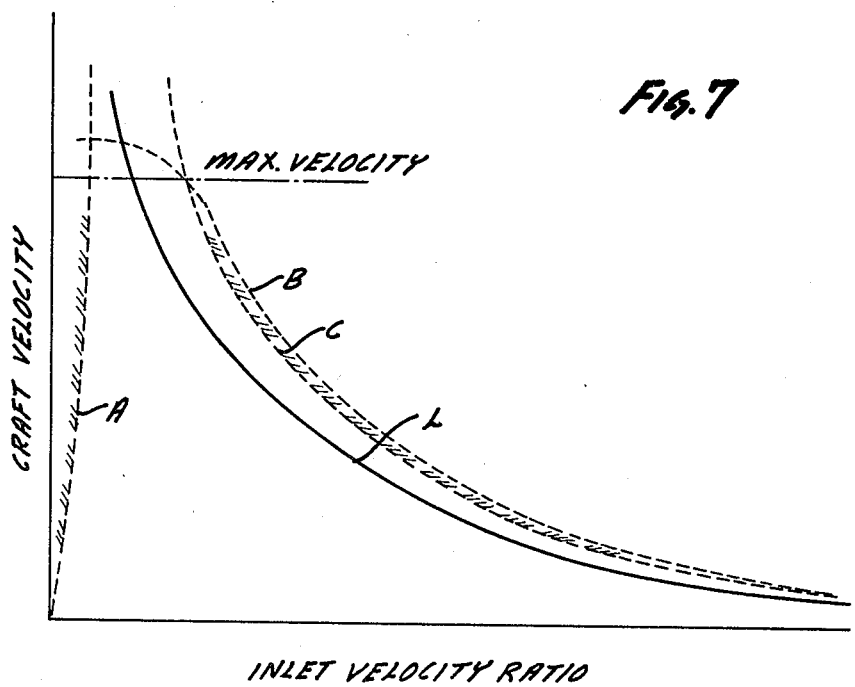

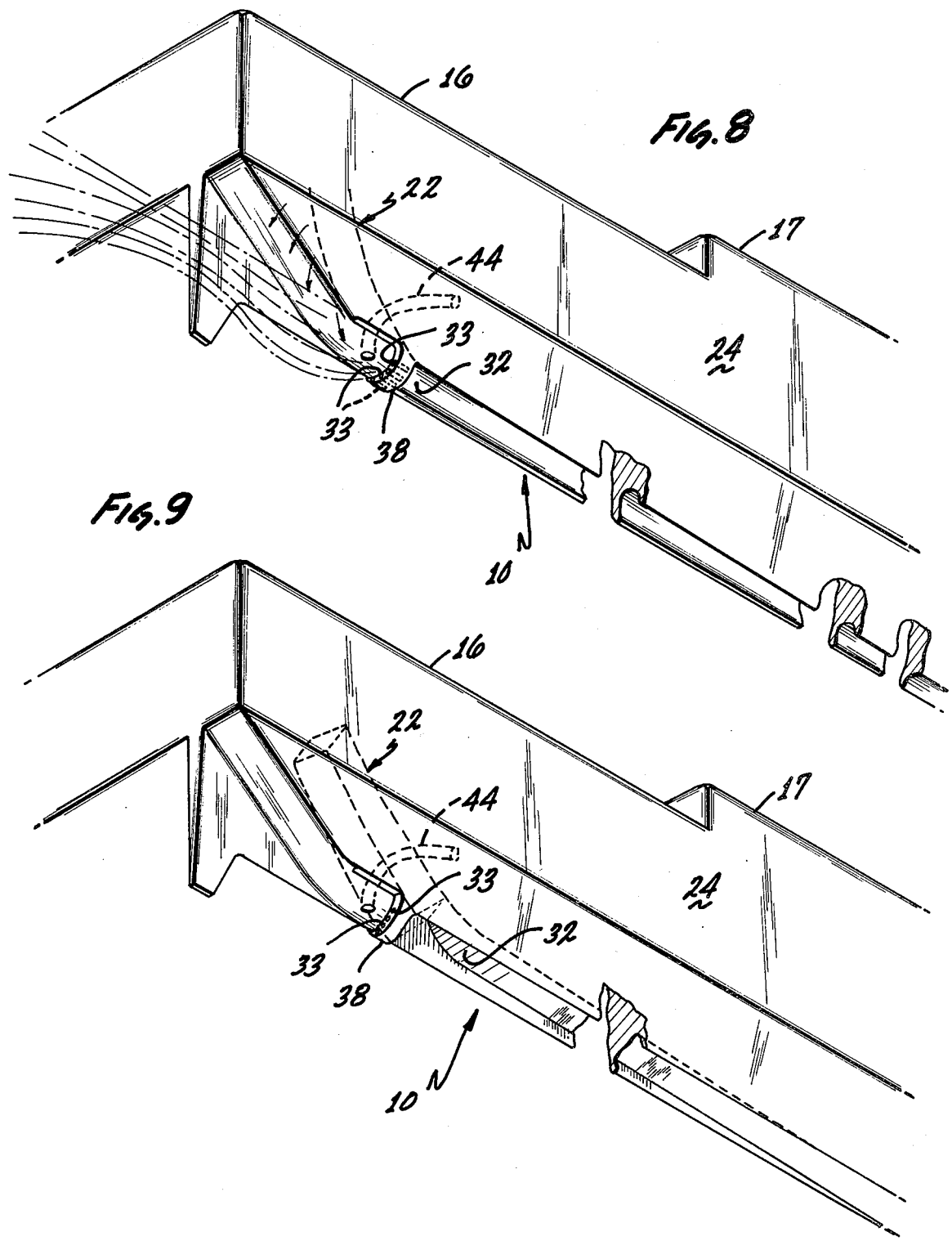

FIXED GEOMETRY WATER JET INLET FOR A SURFACE EFFECT SHIP

BACKGROUND OF THE INVENTION

The invention herein described was made in the course of or under a contract or subcontract thereunder with the Navy Department.

The invention relates generally to surface effect type marine vehicles and, more specifically, to a method of fluid reclamation at high speeds from a reservoir by means of a pump, without incurring cavitation damage to the vulnerable surface of the inlet, thereof.

Water jet inlets in general consist of a ramp roof and a lip or scoop, the latter consisting of an internal and external surface defined by the boundary of fluid (water) ingested and expelled therein. The ratio of the average free stream velocity to the velocity passing a vertical plane therefrom bounded by the lip leading edge and the roof is conventionally known as the inlet velocity ratio (IVR). The lowest upstream point of the ramp tangent to the free stream is referred to as the ramp roof tangency point. The relative elevation of the lip leading edge to the ramp roof tangency point is the drop fraction, taken positive when below the ramp roof tangency point. Cavitation occurs in general when the surface pressure is low enough to allow vapor bubbles to form therefrom. The collapse of the vapor bubble causes severe local loads acting on, and thereby pitting and marring the surface, whereupon functional performance is impaired and the structural damage occurs.

The present state of the art provides cavitation free operation only at the expense of complicated and costly apparatus that reshape the ramp roof and/or the inlet lip surfaces and restrict dependence on IVR. At high speeds, the conventional means fails to provide cavitation free operation in aft (downstream) portion of the external lip surface, without the expense of excessive drag.

SUMMARY OF THE INVENTION

The instant invention provides a means of achieving cavitation free water jet inlet flows, this is accomplished exclusively by inlet duct geometry without need or use of moving parts. The geometry, furthermore, minimizes inlet drag and reduces the probability of ingestion of large flotsam debris resulting in pump damage or destruction.

A successful means of achieving cavitation free, low drag, inlet operation for high performance surface effect (SES) vehicles with a fixed geometry and a successful operation of a truly flush inlet with a negative drop fraction were not achieved until the emergence of the instant invention.

BRIEF DESCRIPTION OF THE DRAWINGS

A more complete appreciation of the invention and many of the attendant advantages thereof will be readily obtained as the same become better understood from the following detailed description when considered in connection with the accompanying drawings wherein:

FIG. 1 is a partial cutaway depicting the assembly and functions of the instant invention installed in a high performance surface effect ship.

FIG. 2 is a partial showing longitudinal cross-section of the instant invention (a round version thereof) as it interfaces to the side hull/fence arrangement of a high performance surface effect ship.

FIG. 3 is a cutaway showing the pertinent geometry of the instant invention as it relates to conventional nomenclature.

FIG. 4 is a cutaway depicting the inlet lip as it relates to the entrained flow boundaries and the direction of flow at high IVR.

FIG. 5 is a cutaway depicting the inlet lip as it relates to the entrained flow boundaries and the direction of flow at low IVR.

FIG. 6 is a showing of a performance diagram of conventional high speed inlets, presented herein for comparison to FIG. 7.

FIG. 7 is a performance diagram of the instant invention.

FIG. 8 is a partial cutaway perspective showing of the stern portion of the surface effect ship including the curvilinear inlet duct showing from FIG. 1.

FIG. 9 is a partial cutaway perspective showing of the stern portion of the surface effect ship disclosing a rectangular version of the inlet duct.

DESCRIPTION OF THE PREFERRED EMBODIMENT

The same numerals will be used throughout the various figures to describe identical elements or parts thereof.

FIG. 1 shows a perspective view of a surface effect ship with the stern cutaway to show the apparatus of the instant invention. The ship 10 comprises a bow seal 12, a stern seal 15, upper deck 16 and superstructure 17. Within the cutaway portion of the stern of the surface effect ship, there is shown the engine area 18, the jet pump 20 which propels the vehicle across the water, and the inlet duct 22 of the instant invention.

Referring now to FIG. 2, the partial cutaway showing of the round version of the instant invention, (a rectangular version shown in FIG. 9) the inlet 22 is shown taken from the environment of FIG. 1. This is a more detailed showing of the side hull/fence 24, the side hull keel plane 26, side wall vent cutout 28, the lip 30 of the inlet duct 22 and the lip external ramp 32.

FIGS. 3 and 8 is a showing of a portion of the instant invention shown in FIG. 2. This is shown as a truly flush inlet with a negative drop fraction. The geometrical arrangement of the inlet surface establish the pressure within the inlet at a level which is above the water vapor pressure level, thus, preventing cavitation therein. The ramp roof 32 originates from the ramp roof tangency point A, which therein establishes the referenced elevation. The segment A-B of the ramp roof 32 exhibits a very large radius of curvature $R_{AB}$ required to prevent cavitation in this region. The extent of the radius $R_{AB}$ is dependent on the maximum speed of the surface effect ship 10, acting at point A, thus, the forward location of the ramp roof tangency point A relative to the leading edge 32 of lip 30, increases with the maximum designed velocity of the craft. The segment B-C of the ramp roof 32 exhibits a smaller transition radius $R_{BC}$, that dovetails to the segment C-I of the expansion point of inlet duct 22 at the area 34 that feeds to the pump 20. The inlet lip 30 consists of an internal duct floor surface 36, an external surface 38 and a transitioning radius or ogive 40. The reference inlet plane F-E-D is taken as a vertical plane tangent to the leading edge 31 of inlet lip 30, at point E. The drop fraction is a measure of the verticle elevation of the lip leading edge 31 relative to the ramp roof tangency point.

drop fraction = (F−E/F−D)

taken positive if E is below point F and vice versa. When point G is at the same elevation as the ramp roof tangency point A, the inlet is described as truly flush. The most aft (downstream) geometry of the external lip surface 38, at point G, is maintained at an angle of incidence $\theta_4$ and immediately ventilated into the ventilation cavity 42 which is opened to the atmosphere or optionally opened to a cushion air supply through the duct 44. This venting either to the atmosphere or to both the atmosphere and to the cushion air supply provides a back pressure on the aft portion of the inlet lip. This back pressure forces the normal static pressure at this point to be equal to the back pressure level which, in turn, raises the static pressure upstream in the immediate region of the ramp roof 32, causing the water flow to curve into the inlet without a substantial reduction of static pressure, i.e., the back pressure assists in keeping the static pressure at the ramp roof above the water vapor pressure. The ramping action at point G causes the external flow of water to assume a hydraulic groove 46, the boundaries of which is determined by a balance of static pressure to the ventilation cavity pressure (normally atmospheric pressure) and therefore adds to the ramping effect of surface G-F. The ramping angle $\theta_4$ can become small, approaching zero as the ventilated region G approaches the leading edge E. The inlet velocity ratio (IVR) is a ratio of $V_1$, the velocity entering the inlet 22 passing through plane D-E to the free stream velocity U. The absolute velocity at the entrance D-E is dictated by the horsepower of pump 20 and the size of the inlet area therein, thus, the dimension D-E. An inherent feature of the instant invention is the use of a large entrance area, thereby reducing the absolute velocity traversing the plane D-E. When the IVR is high, streamlines adjust such as described by the entrained flow boundary 48. Fluid elements above the entrained boundary enter the inlet, whereas fluid elements below the entrained boundary are expelled from the inlet. The reduction in the stream tube area bounded by the entrained boundary 48, and the ramp roof 32, accelerates the flow from U (a low value in this case) to $V_1$ at the inlet entrance D-E.

FIG. 4 illustrates the flow pattern shown by the arrows as it approaches the inlet lip 30 for the case of high IVR. The entrainment boundary 48 intersects the lip nose radius 40, at point L, at an angle of incidence of $A_9$. The transition between the nose radius 40, and the internal duct floor surface 36, occurs such that a tangent line exhibits an angle of $\theta_{11}$ of the same order of magnitude as $A_9$. The magnitude of this angle is dictated by the maximum acceptable IVR design limits.

FIG. 5 depicts the flow pattern shown by the arrows as it approaches the inlet lip 30 for the case of very low IVR. The entrainment boundary 50 intersects the lip nose radius 40 at point K, at an angle of incidence of $A_8$, which is dependent upon the drop fraction in the horizontal (upstream) distance of the ramp roof tangency point A (see FIG. 3). The external lip ramp angle $\theta_4$, is equal to, or greater than, the angle $A_8$, thus providing a positive pressure on the external lip ramp surface 38. The horsepower of pump 20, inlet area, ramp tangency point location and drop fractions determine the lower limit of IVR to which the lip external surface is designed for.

Now referring back to FIG. 3, is a hydraulic groove 46, generated by the external lip surface 38 and the ambient pressure restriction on the groove surface. The hydraulic groove is the shape that the water assumes as it leaves the trailing edge of the external lip surface 38. The specific shape of this hydraulic groove is a function of the angle of the external lip (vertical momentum imparted to the water) and the pressure (approximately one atmosphere) on the cavity 42 which causes the local pressure of the water surface (the lower boundry of the hydraulic "groove") to be equal to the atmospheric pressure. This is a boundry condition of the hydraulic groove. Further embodiments (see FIGS. 8 and 9) have a plurality of side by side passageways 33 positioned across the lip 30. These passageways assure that the back pressure of approximately one atmosphere is present in the ventilated step 42 is transmitted to the region of the leading edge of the inlet lip. This assures an increase of pressure in the region of the leading edge of the lip, which in the case of low IVR can become significantly low due to the angle approach of the jet stream. In essence, the passageways 33 raise the local static pressure in the region of the leading edge of the lip to the levels above vapor pressure, thereby preventing cavitation in that immediate vicinity. The hydraulic groove behaves like a vertical extension of the external lip surface, therein affecting the upstream at the ramp roof tangency point, aiding the directional change necessary to entrain the flow without requiring severe low pressure in the segments A-B of the ramp roof 32. Thus, the virtual afterbody of the external lip serves to alleviate the cavitation inducing tendency of the curvature of the ramp roof 32, at high speeds (low IVR). A further embodiment includes a plurality of side by side passageways 33 positioned across lip 30 leading from the ventilation cavity 42 to the leading edge 32 to alleviate cavitation at low IVR. Ideally the passageways extend to the foremost edge of the lip.

The external lip surface 38, at low IVR, is a critical source of cavitation. The virtual afterbody generated by the small external lip ramp 38, immediately ventilated at point G, avoids this situation provided the angle $\theta_4$ is equal to or greater than the angle $A_8$. Inlet drag is minimized by letting the angle $\theta_4$ approach the angle $A_8$ for the maximum velocity of the craft (lowest IVR). The large ventilation cutout results in a considerable drag savings due to the friction drag on craft components aft of the lip, generally off-setting the drag increase due to the small ramp lip 38, by a considerable margin.

Ingestion of light, highly buoyant debris, such as plastic bottles, etc., is a common source of trouble. Whereas the blades of pump 22 would normally grind these bodies with no difficulty, problem areas arise when these bodies jam the inlet, particularly for small inlets. The large inlet area required by the instant invention precludes this occurrence. Heavier (near neutrally buoyant) large bodies, on the other hand, could cause severe pump damage. To this effect, the truly flush inlet with a negative drop fraction, attainable by the instant invention precludes this type of debris from entering the inlet, since debris of this type are sluggish and slow to respond. The angle of incidence of the external lip ramp, $\theta_4$ serve as an impact barrier that bulldozes the more stubborn flotsam contaminants, deflecting them away from the inlet opening.

THE OPERATION OF THE PREFERRED EMBODIMENT

FIG. 6 depicts the conventional approach presently used in the state of the art for avoiding cavitation in a high performance water jet inlet. The performance curve provides a plot of the cavitation inception velocity VS. The inlet velocity ratio showing the boundaries associated with cavitation inception at the external lip surfaces (curve A), the ramp roof surface (curve B), and the internal lip surface (curve C). The solid line (load line) pertains to the propulsive operation of the surface effect ship. The numeral 1 subscripts pertain to a given shape implemented to the ramp (conventional) which only provides cavitation free performance from IVR ranges from 1 to 2 in the abscissa. In order to expand this range (say, from 2 to 3), it is necessary to reconfigure the shape of the ramp surface, normally this is performed by the use of hydraulic cylinders and associated operating means. The band of allowable IVR operation in the vicinity of the maximum speed of the surface effect ship is very small and rapid changes in IVR, or misdirected shaping of the ramp, presents a high risk potential cavitation. The shift in the load line is associated with changes in the inlet area due to reconfiguring the ramp.

The performance curve for the instant invention is illustrated in FIG. 7. The large inlet area of the instant invention provides a single load line (L) shifted towards the lower IVR. The large angle of incidence of the small external lip ramp (item 38 of FIG. 3) results in a very steep incipient cavitation limit, curve A in FIG. 7. The ramp roof incipient, cavitation curve B, features a cross over point at low IVR. The incipient cavitation velocity at the cross over can be designed to occur above the maximum velocity of the surface effect ship by tailoring the radius $R_{AB}$ of FIG. 3. The larger the radius, the higher the cross over point. Curve C represents the cavitation limits associated with the internal lip and is a function of the lip radius 40 (FIG. 3) and the expansion angle of the divergent section 34 (FIG. 3). The combined boundaries of A, B and C of FIG. 7 readily accommodate the load line throughout the entire design performance of the surface effect ship. The pertinent inlet areas, characteristic radii, external lip ramp and drop fraction are best determined to suit a given surface effect ship's operational profile by means of a wind tunnel or a water tunnel in subscale models.

An important feature of the fixed inlet of the instant invention is its ability to operate over a large IVR range by hydrodynamically effectuating an inlet area which varies directly with IVR. A separation or near stagnation bubble forms on the ramp roof (its magnitude being inversely proportional to IVR) in the vicinity of the inlet throat which in essence achieves hydrodynamically the equivalent of a variable roof ramp.

Although the invention has been described relative to the exemplary embodiments thereof, it will be understood by those skilled in the art, that variations and modifications may be effected in the embodiments without departing from the scope and spirit of this invention.

What is claimed as new and useful and desired to be secured by United States Letters Patent is:

1. A fixed geometry water inlet duct for a surface effect ship for providing a constant cavitation free supply of water to a propulsion jet pump, said ship having side fences, each of said side fences having a curvilinear bottom hull surface, said inlet duct comprising:
    a ramp roof portion extending rearward and forming a continuation of the bottom hull surface and extending rearward to the inlet of said jet pump;
    a duct floor portion extending from a position intermediate the forward and aft portions of said ramp roof portion and extending to said inlet of said jet pump, said ramp roof portion and said duct floor portion being continuous for the length of said duct floor portion;
    an enlarged lip portion positioned at the leading edge of said duct floor portion; and
    a ventilation cavity adjacent said enlarged lip portion.

2. The invention as defined in claim 1, wherein said ramp roof portion is longitudinally curvilinear and has at least three different radii of longitudinal curvature between said bottom surface and jet pump inlet.

3. The invention as defined in claim 2, wherein the smallest of said at least three radii is intermediate said bottom surface and the jet pump inlet adjacent said enlarged tip portion.

4. The invention as defined in claim 1, wherein said duct floor portion between said enlarged lip portion and the jet pump inlet is substantially rectilinear in longitudinal cross-section.

5. The invention is defined in claim 1, wherein said inlet converges aft of said enlarged lip portion and then diverges toward the jet pump inlet.

6. The invention as defined in claim 1, wherein the forward surface of said enlarged lip portion is curvilinear.

7. The invention as defined in claim 1, wherein said inlet is curvilinear in cross-section.

8. The invention as defined in claim 1, wherein said ventilation cavity is open to the atmosphere.

9. The invention as defined in claim 1, wherein said ventilation cavity is open to the cushion air supply.

10. The invention as defined in claim 1, wherein a plurality of passageways are provided between said ventilation cavity and the leading edge of said enlarged lip portion.

11. The invention as defined in claim 10, wherein said passageways terminate at said leading edge of said enlarged lip portion.

* * * * *